United States Patent
Umeda et al.

(10) Patent No.: US 11,236,227 B2
(45) Date of Patent: Feb. 1, 2022

(54) HEAT DISSIPATION MATERIAL ADHERING COMPOSITION, HEAT DISSIPATION MATERIAL HAVING ADHESIVE, INLAY SUBSTRATE, AND METHOD FOR MANUFACTURING SAME

(71) Applicant: TATSUTA ELECTRIC WIRE & CABLE CO., LTD., Higashiosaka (JP)

(72) Inventors: Hiroaki Umeda, Kizugawa (JP); Kazuhiro Matsuda, Kizugawa (JP); Ken Yukawa, Kizugawa (JP)

(73) Assignee: TATSUTA ELECTRIC WIRE & CABLE CO., LTD., Higashiosaka (JP)

( * ) Notice: Subject to any disclaimer, the term of this patent is extended or adjusted under 35 U.S.C. 154(b) by 113 days.

(21) Appl. No.: 15/737,912

(22) PCT Filed: Jun. 15, 2016

(86) PCT No.: PCT/JP2016/002896
§ 371 (c)(1),
(2) Date: Dec. 19, 2017

(87) PCT Pub. No.: WO2017/002315
PCT Pub. Date: Jan. 5, 2017

(65) Prior Publication Data
US 2018/0298185 A1 Oct. 18, 2018

(30) Foreign Application Priority Data

Jun. 29, 2015 (JP) .............................. JP2015-130112

(51) Int. Cl.
*C08L 63/00* (2006.01)
*C09J 11/04* (2006.01)
(Continued)

(52) U.S. Cl.
CPC .............. *C08L 63/00* (2013.01); *C08K 3/042* (2017.05); *C08K 3/08* (2013.01); *C08K 3/22* (2013.01);
(Continued)

(58) Field of Classification Search
CPC . C08K 3/042; C08K 3/08; C08K 3/22; C08K 3/36; C08K 2003/0806;
(Continued)

(56) References Cited

U.S. PATENT DOCUMENTS 5,616,405 A * 4/1997 Kishi ..................... B29C 70/08
442/175
2004/0156175 A1 8/2004 Nakamura et al.
(Continued)

FOREIGN PATENT DOCUMENTS

CN 102272908 A 12/2011
CN 103154070 A 6/2013
(Continued)

OTHER PUBLICATIONS

Hexion, "Technical Data Sheet EPON Resin 862", Jun. 23, 2021 (Year: 2021).*
(Continued)

*Primary Examiner* — David T Karst
(74) *Attorney, Agent, or Firm* — Westerman, Hattori, Daniels and Adrian, LLP

(57) ABSTRACT

Provided are a heat dissipation material capable of ensuring stable adhesion while reducing cost, an inlay substrate using the same, and a method for manufacturing the same. A heat dissipation material having adhesive is obtained by coating a portion or the whole of the heat dissipation material with a heat dissipation material adhering composition including a resin component containing an epoxy resin, a curing agent,
(Continued)

and an inorganic filler, and having a complex viscosity at 80° C. of $1 \times 10^3$ Pa·s to $5 \times 10^6$ Pa·s.

11 Claims, 2 Drawing Sheets

(51) Int. Cl.
| | |
|---|---|
| *C09J 5/06* | (2006.01) |
| *H01B 13/00* | (2006.01) |
| *C09J 163/00* | (2006.01) |
| *C09J 7/30* | (2018.01) |
| *C09J 7/20* | (2018.01) |
| *C08K 3/04* | (2006.01) |
| *C08K 3/08* | (2006.01) |
| *C08K 3/22* | (2006.01) |
| *C08K 3/36* | (2006.01) |

(52) U.S. Cl.
CPC ................... *C08K 3/36* (2013.01); *C09J 5/06* (2013.01); *C09J 7/20* (2018.01); *C09J 7/30* (2018.01); *C09J 11/04* (2013.01); *C09J 163/00* (2013.01); *H01B 13/00* (2013.01); *C08K 2003/0806* (2013.01); *C08K 2003/0831* (2013.01); *C08K 2003/0862* (2013.01); *C08K 2003/2227* (2013.01); *C09J 2301/408* (2020.08); *C09J 2400/10* (2013.01); *C09J 2463/00* (2013.01)

(58) Field of Classification Search
CPC .... C08K 2003/0862; C08K 2003/2227; C08K 2003/0831; C09K 7/20; C09K 7/30; C09J 5/06; C09J 11/04; C09J 163/00; C09J 7/20; C09J 7/30; C09J 2400/10; C09J 2463/00; C09J 2301/408; H01B 13/00; C08L 63/00
USPC .......................................................... 523/400
See application file for complete search history.

(56) References Cited

U.S. PATENT DOCUMENTS

| | | | |
|---|---|---|---|
| 2006/0188727 | A1 | 8/2006 | Ito et al. |
| 2007/0200133 | A1 | 8/2007 | Hashimoto et al. |
| 2011/0038124 | A1* | 2/2011 | Burnham ................ H01L 24/29 |
| | | | 361/717 |
| 2011/0120761 | A1* | 5/2011 | Kawai .................. H05K 1/0353 |
| | | | 174/258 |
| 2011/0261535 | A1 | 10/2011 | Izutani et al. |
| 2014/0030848 | A1 | 1/2014 | Ikemoto et al. |
| 2014/0367883 | A1 | 12/2014 | Hatakeyama et al. |
| 2015/0090922 | A1 | 4/2015 | Hatakeyama et al. |

FOREIGN PATENT DOCUMENTS

| | | | |
|---|---|---|---|
| JP | 2004-179309 | A | 6/2004 |
| JP | 2004-315688 | A | 11/2004 |
| JP | 2004-319823 | A | 11/2004 |
| JP | 2006-156610 | A | 6/2006 |
| JP | 2006-339559 | A | 12/2006 |
| JP | 2007-246861 | A | 9/2007 |
| JP | 4988609 | B2 | 8/2012 |
| JP | 2012-207222 | A | 10/2012 |
| JP | 5092050 | B1 | 12/2012 |
| JP | 2013-6893 | A | 1/2013 |
| TW | 201020304 | A | 6/2010 |
| WO | 2013/118848 | A1 | 8/2013 |

OTHER PUBLICATIONS

Hexion, "Technical Data Sheet EPON Resin 824", Jun. 23, 2021 (Year: 2021).*
International Search Report dated Aug. 9, 2016, issued in counterpart International Application No. PCT/JP2016/002896 (2 pages).
Extended (supplementary) European Search Report dated Jan. 7, 2019, issued in counterpart EP Application No. 16817427.4. (9 pages).
Office Action dated Mar. 4, 2020, issued in counterpart Taiwanese Patent Application No. 105119557 (w/ English machine translation; 10 pages).
Office Action dated Jan. 6, 2020, issued in counterpart CN Application No. 201680037641.1, with English translation (13 pages).

* cited by examiner

HEAT DISSIPATION MATERIAL ADHERING COMPOSITION, HEAT DISSIPATION MATERIAL HAVING ADHESIVE, INLAY SUBSTRATE, AND METHOD FOR MANUFACTURING SAME

TECHNICAL FIELD

The present invention relates to a heat dissipation material mainly for the purpose of dissipating heat of a substrate, an inlay substrate using the same, and a method for manufacturing the same.

BACKGROUND ART

For a substrate on which a power module and a high power LED are mounted, a function of dissipating heat is required. For this purpose, in the related art, as in an inlay substrate disclosed in PTL 1, a hole is provided in the substrate for the purpose of dissipating heat of the substrate, and a heat dissipation material is inserted into the hole. As a method for manufacturing the inlay substrate, for example, a method of inserting a heat dissipation material into the substrate, applying pressure from above, and fixing by plastically deforming is used. However, in a case where the method is used, since the method is manual work, the cost is likely to be high, and problems such as the heat dissipation material falling out due to lack of pressure have occurred. Therefore, there is a demand for a technology to ensure stable adhesion while reducing a cost.

CITATION LIST

Patent Literature

[PTL 1] Japanese Patent No. 4988609

SUMMARY OF INVENTION

Technical Problem

The present invention has been made in view of the above problems, and an object thereof is to provide a heat dissipation material capable of securing stable adhesion while reducing a cost. In addition, another object is to provide a highly reliable inlay substrate using the heat dissipation material and a method for manufacturing the same.

Solution to Problem

In order to solve the above problems, a heat dissipation material adhering composition according to the present invention includes a resin component containing an epoxy resin, a curing agent, and an inorganic filler, in which a complex viscosity at 80° C. is within the range of $1 \times 10^3$ Pa·s to $5 \times 10^6$ Pa·s.

The resin component is one type or two or more types of resins selected from a solid epoxy resin and a liquid epoxy resin.

The curing agent may use one type or two or more types selected from an imidazole-based curing agent, a cation-based curing agent, and a radical-based curing agent.

The inorganic filler may use one type or two or more types selected from gold powder, silver powder, copper powder, nickel powder, powder of alloy including two or more types of metals selected from gold, silver, copper, and nickel, silver coated copper powder, gold coated copper powder, silver coated nickel powder, gold coated nickel powder, silica, alumina, boron nitride, graphene, and carbon.

A heat dissipation material having adhesive of the present invention is obtained by coating a portion or the whole of a surface of a heat dissipation material with the heat dissipation material adhering composition. An inlay substrate of the present invention is prepared by using the heat dissipation material having adhesive.

In addition, a method for manufacturing the inlay substrate of the present invention includes a step of preheating a substrate, a step of inserting the heat dissipation material having adhesive into the heated substrate, and a step of fixing the heat dissipation material having adhesive to the substrate by pressurizing the heat dissipation material.

Advantageous Effects of Invention

According to the heat dissipation material adhering composition of the present invention, it is possible to obtain the heat dissipation material having adhesive, which can be easily fixed to the substrate and can ensure stable adhesion. Accordingly, it is possible to solve the problems of the technique in the related art such as the heat dissipation material falling out. In addition, since work efficiency can be improved, it is possible to reduce the cost.

DESCRIPTION OF EMBODIMENTS

Figure 1A:
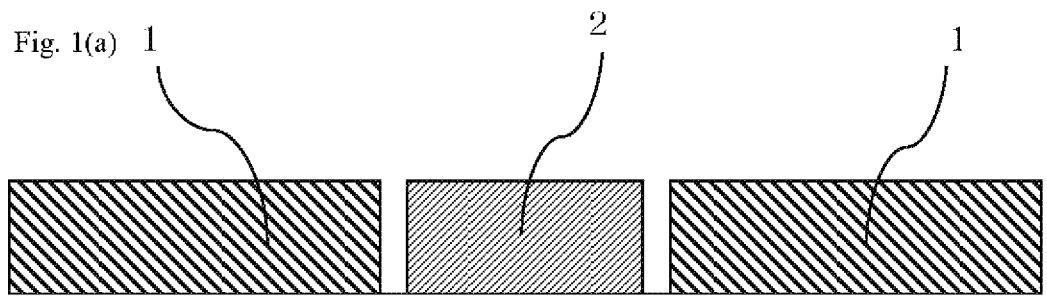
FIGS. 1(a)-1(d) are a schematic cross-sectional view illustrating a step of manufacturing a heat dissipation material having adhesive by applying a heat dissipation material adhering composition to a heat dissipation material.
Figure 1B:
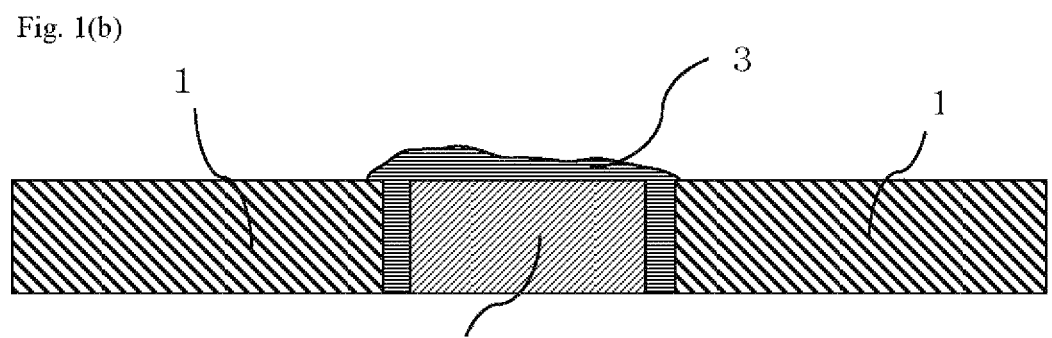

Hereinafter, embodiments of the present invention will be described in detail.

A heat dissipation material adhering composition according to the embodiment contains a resin component containing an epoxy resin, a curing agent, and an inorganic filler.

As the epoxy resin, one type or two or more types of resins selected from a solid epoxy resin and a liquid epoxy resin can be used.

Here, "solid epoxy resin" refers to an epoxy resin which is solid at room temperature (25° C.). The solid epoxy resin is not particularly limited as long as the resin contains an epoxy group in a molecule and is solid at room temperature (25° C.), and specific examples thereof include trisphenol type epoxy resin, trisphenol methane type epoxy resin, bisphenol A type epoxy resin, phenol novolak type epoxy resin, and the like.

In addition, the liquid epoxy resin is not particularly limited as long as the resin contains an epoxy group in a molecule and is liquid at room temperature (25° C.), and specific examples thereof include bisphenol A type epoxy resin, bisphenol F type epoxy resin, glycidyl amine-based epoxy resin, glycidyl ether-based epoxy resin, and the like.

Each of the solid epoxy resin and the liquid epoxy resin can be used alone, but it is preferable to use a combination of the solid epoxy resin and the liquid epoxy resin.

In the total amount of 100 parts by mass of the solid epoxy resin and the liquid epoxy resin, the blending amount of the solid epoxy resin is not limited, but the blending amount is preferably 20 to 90 parts by mass, and more preferably 40 to 80 parts by mass. When the blending amount is 20 parts by mass or more, tackiness does not remain even after solvent drying, and handling becomes easy. In addition, when the blending amount is 90 parts by mass or less, the solvent is unlikely to volatilize, so that it is difficult for a film to be formed on the surface of the paste, and it is easy to apply the resin to a heat dissipation material.

In the heat dissipation material adhering composition according to the embodiment, bismaleimide compounds can be used in addition to the solid epoxy resin and the liquid epoxy resin as the resin component.

As the bismaleimide compound, the compound represented by General Formula (I) below can be used.

[chemical formula 1]

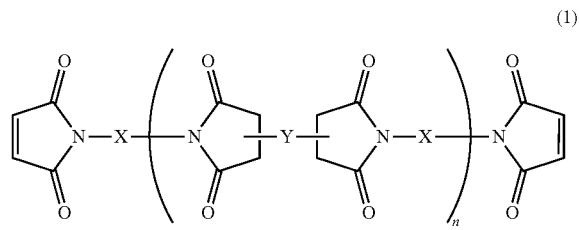

(1)

However, in Formula (I), X represents an aliphatic, alicyclic, or aromatic hydrocarbon group having 10 to 30 carbon atoms in the main chain, and these groups may have a hetero atom, a substituent, or a siloxane skeleton. X is preferably an aliphatic hydrocarbon group, an alicyclic hydrocarbon group, or an aliphatic hydrocarbon group modified with an alicyclic hydrocarbon group, is more preferably an aliphatic hydrocarbon group having 10 to 55 carbon atoms, and even more preferably 10 to 40 carbon atoms.

Y represents an aliphatic, alicyclic, or aromatic hydrocarbon group, and these groups may have a hetero atom, a substituent, a phenyl ether skeleton, a sulfonyl skeleton, or a siloxane skeleton. Y is preferably an aromatic hydrocarbon group.

n is the number of repeating units and represents a number in the range of 1 to 20. When n is 1 or more, a heat dissipation material having adhesive which can ensure stable adhesion can be obtained. In addition, n is preferably 20 or less, and more preferably 10 or less. When n is 20 or less, the heat dissipation material having adhesive which can ensure stable adhesion can be obtained. Although one type of the bismaleimide compound in which n is 1 to 20 may be used alone, or two or more types thereof may be used in combination, it is more preferable that the bismaleimide compound is a mixture of compounds in which n is 1 to 10.

Since a vibration resistance is improved by being a mixture compounds in which n is 1 to 10, it is suitably used for a substrate used for a product such as an automobile where vibration is intense.

The method for manufacturing the above bismaleimide compound is not particularly limited, and it can be manufactured, for example, by a known method of subjecting an acid anhydride and a diamine to a condensation reaction, and thereafter dehydrating to effect cyclization (imidization).

As the above bismaleimide compound, a commercially available compound can be used, and as a preferred example thereof, BMI-3000 (synthesized from dimer diamine, pyromellitic dianhydride, and maleic anhydride), BMI-1500, BMI-2550, BMI-1400, BMI-2310, BMI-3005 manufactured by DESIGNER MOLECURES Inc., or the like may be suitably used.

Among these, BMI-3000 manufactured by DESIGNER MOLECURES Inc., which is a bismaleimide compound particularly suitably used in the present invention is represented by Structural Formula below. In Formula, n is a number in the range of 1 to 20.

[chemical formula 2]

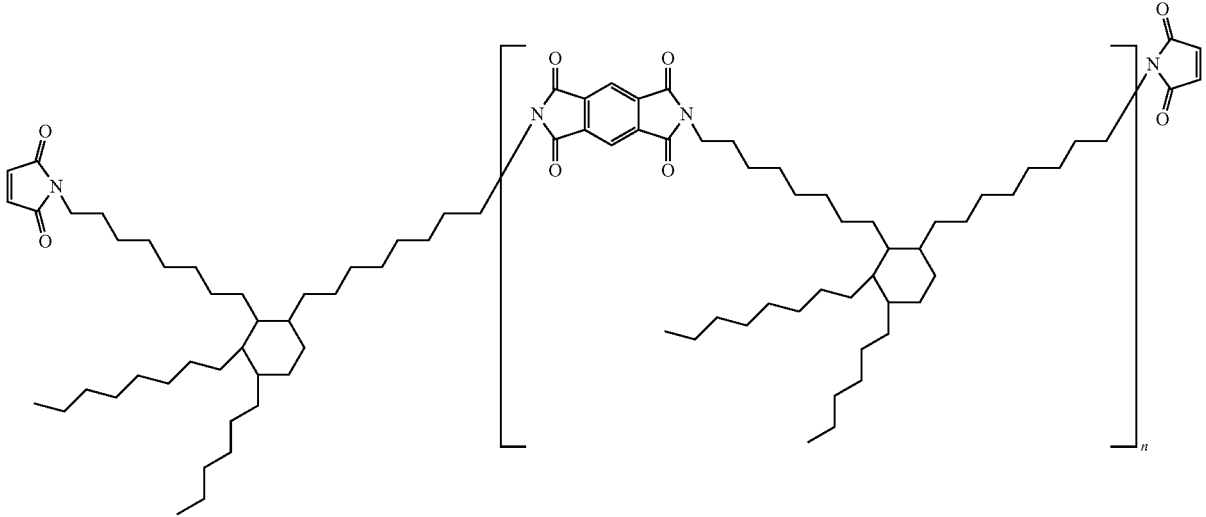

In a case where the bismaleimide compound is used, the blending amount of the bismaleimide compound is not limited, but it is preferably 5 to 20 parts by mass in 100 parts by mass of the resin component.

The curing agent is not particularly limited, and one type selected from the group consisting of an imidazole-based curing agent, a cation-based curing agent, and a radical-based curing agent can be used alone, or two or more types thereof can be used in blending.

Examples of the imidazole-based curing agents include imidazole, 2-undecylimidazole, 2-heptadecylimidazole, 2-ethylimidazole, 2-phenylimidazole, 2-ethyl-4-methylimidazole, 1-cyanoethyl-2-undecylimidazole, 2-phenylimidazole, 2,4-diamino-6-[2'-methylimidazolyl-(1')]-ethyl-s-triazine, and the like. The imidazole-based curing agent is used as the curing agent, so that it is possible to improve conductivity and heat dissipation.

Examples of the cation-based curing agent include onium-based compounds represented by amine salts of boron trifluoride, P-methoxybenzene diazonium hexafluorophosphate, diphenyliodonium hexafluorophosphate, triphenylsulfonium, tetra-n-butylphosphonium tetraphenylborate, tetra-n-butylphosphonium-o,o-diethylphosphorothioate, and the like.

Examples of the radical-based curing agent (polymerization initiator) include di-cumyl peroxide, t-butyl cumyl peroxide, t-butyl hydroperoxide, cumene hydroperoxide, azo-based compounds, and the like.

The blending amount of the curing agent is not particularly limited, and the blending amount is preferably 0.5 to 30 parts by mass, more preferably 1 to 20 parts by mass, and even more preferably 3 to 15 parts by mass, based on 100 parts by mass of the resin component.

The inorganic filler is not particularly limited, and examples thereof include powder of metal such as gold, silver, copper, or nickel, powder of alloy including two or more types of metals selected from gold, silver, copper, and nickel, silver coated copper powder, gold coated copper powder, silver coated nickel powder, gold coated nickel powder, carbon material such as graphene and carbon, silica, alumina, boron nitride, and the like. These inorganic fillers may be used alone, or two or more types thereof may be used in blending.

By using the inorganic filler, it is possible to achieve desired conductivity, heat dissipation property or linear expansion coefficient. In a case where conduction between the heat dissipation material and the through-hole plating is required, it is preferable to use powder of metal such as gold, silver, copper, or nickel, powder of alloy including two or more types of metals selected from gold, silver, copper, and nickel, silver coated copper powder, gold coated copper powder, silver coated nickel powder, gold coated nickel powder, graphene, or carbon. In a case where conductivity is not required, silica, alumina, or boron nitride may be used.

The blending amount of the inorganic filler is not particularly limited, and the blending amount is preferably 20% to 65% by volume (vol %), more preferably 20% to 60% by volume, and even more preferably 30% to 60% by volume, based on the total amount of the resin component, the curing agent, and the inorganic filler.

The heat dissipation material adhering composition of the present invention can be obtained by sufficiently mixing each of the above-mentioned components with a solvent which is used if necessary.

The solvent is not particularly limited, and an organic solvent is preferably used, and specific examples thereof include methyl ethyl ketone, toluene, methanol, tetralin, and the like. These solvent may be used alone, or two or more types thereof may be used in blending.

The blending amount of the solvent is not particularly limited, and the blending amount is preferably 20 to 200 parts by mass, more preferably 40 to 180 parts by mass, and even more preferably 50 to 150 parts by mass, based on 100 parts by mass of the resin component.

An additive which has been added to the same type of heat dissipation material adhering composition in the related art can be added to the heat dissipation material adhering composition of the present invention within a range not deviating from the object of the present invention.

The above heat dissipation material adhering composition preferably has a complex viscosity of $1 \times 10^3$ Pa·s to $5 \times 10^6$ Pa·s at 80° C. in the absence of a solvent, and more preferably has a complex viscosity of $1 \times 10^4$ Pa·s to $1 \times 10^6$ Pa·s.

The complex viscosity at 80° C. can be made within the above range by selecting the type and amount of each component to be blended.

As described later, after inserting the heat dissipation material having adhesive into the substrate, the heat dissipation material is normally pressed while being heated to cure the heat dissipation material adhering composition, and at that time, when the complex viscosity at 80° C. is $1 \times 10^3$ Pa·s or more, the heat dissipation material adhering composition is unlikely to flow out from between the heat dissipation material and the substrate at the time of curing, and it is easy to ensure the adhesion strength between the substrate and the heat dissipation material. In addition, when the complex viscosity at 80° C. is $5 \times 10^6$ Pa·s or less, the fluidity of the heat dissipation material adhering composition becomes appropriate, a gap is unlikely to be generated between the heat dissipation material and the substrate, and it is easy to ensure the adhesion strength between the heat dissipation material and the substrate.

In the heat dissipation material having adhesive of the present invention, a portion or the whole of a surface of the heat dissipation material is coated with the heat dissipation material adhering composition.

The heat dissipation material is not particularly limited as long as the material is used for the same purpose in the related art, and specific examples thereof include metals such as copper, porous copper, iron, and nickel, carbon molded article, and the like.

The carbon molded article is not particularly limited, and examples thereof include a hybrid material of carbon and carbon fiber, and the like.

A shape of the heat dissipation material is not particularly limited, and a columnar shape such as a cylindrical shape is usually preferable.

A method for manufacturing the heat dissipation material having adhesive is not particularly limited, and the heat dissipation material having adhesive can be manufactured by, for example, a dipping method. In a case of the dipping method, the heat dissipation material is immersed in a solution in which the heat dissipation material adhering composition is dissolved in a solvent, and thereafter the material is pulled up, and the solvent is removed by drying, so that a heat dissipation material having adhesive whose entire surface of the heat dissipation material is coated with the heat dissipation material adhering composition can be manufactured. If necessary, before the heat dissipation material is immersed in the solution, a portion of the surface of the heat dissipation material may be previously coated with a tape or the like. In this manner, it is possible to freely design the position and area of the heat dissipation material which is coated with the heat dissipation material adhering composition.

Figure 1C:
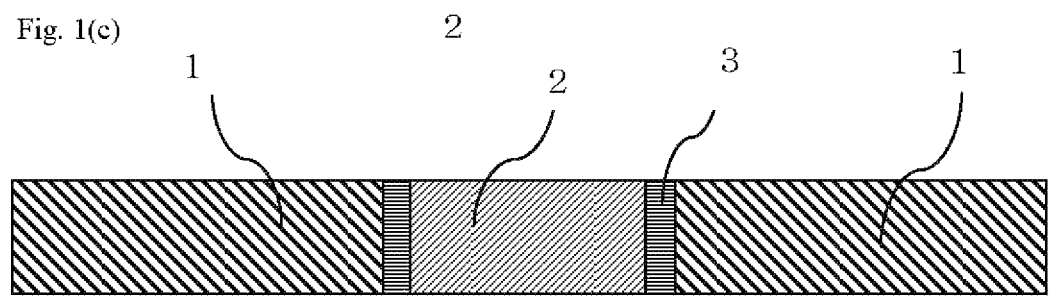
Figure 1D:
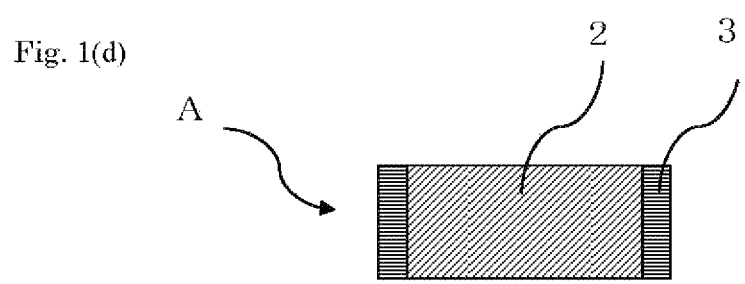

As another manufacturing method, for example, a method in which a heat dissipation material 2 is inserted into a fluororesin sheet 1 provided with a hole as illustrated in FIG. 1(*a*), and a heat dissipation material adhering composition 3 is poured into a gap between the hole and the heat dissipation material 2 as illustrated in FIG. 1(*b*), the excessive heat dissipation material adhering composition 3 is removed as illustrated in FIG. 1(c), and thereafter the solvent is removed by drying and the heat dissipation material having adhesive is taken out from the fluororesin sheet 1 can be used. According to this method, as illustrated in FIG. 1(d), it is possible to manufacture a heat dissipation material A having adhesive, in which the side surface of the heat dissipation material is coated with the heat dissipation material adhering composition.

In any of these methods, the condition for drying and removing the solvent is not particularly limited, and it is preferably 30 to 120 minutes at 50° C. to 80° C., and more preferably 30 to 60 minutes at 50° C.

Figure 2A:
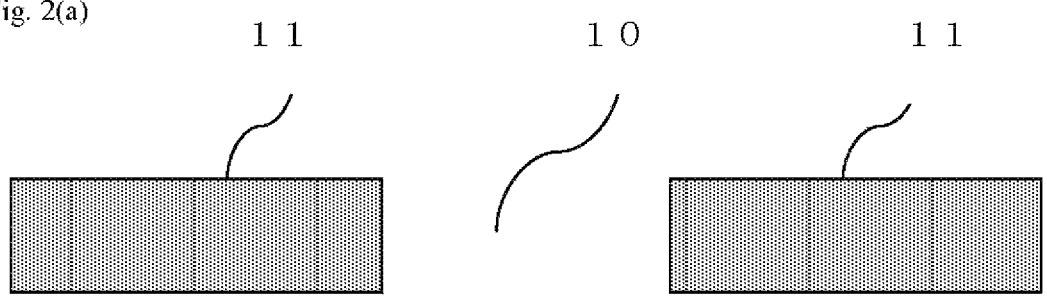
FIGS. 2(a)-2(b) are a schematic cross-sectional view illustrating a step of fixing the heat dissipation material having adhesive on a substrate.
Figure 2B:
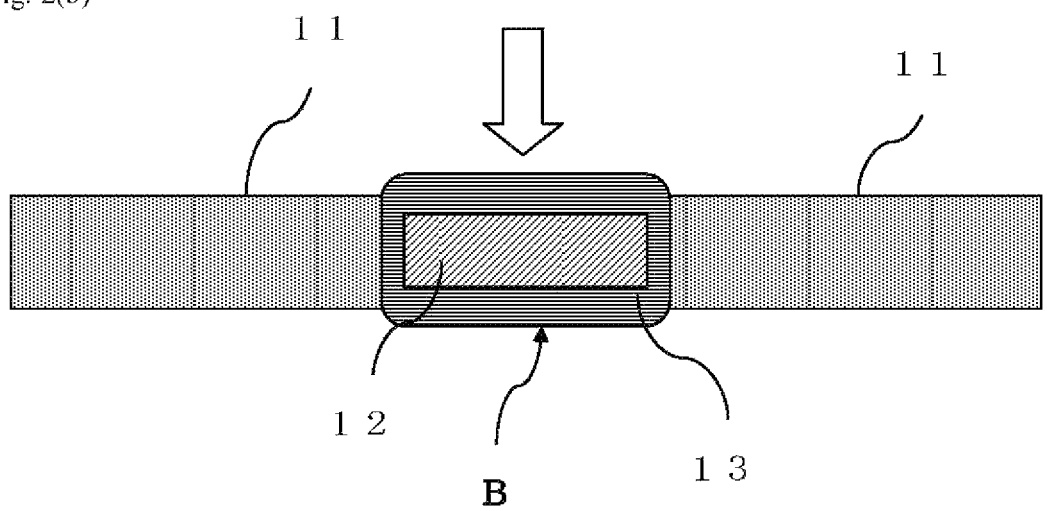

The heat dissipation material having adhesive obtained in the above manner can be suitably used for manufacturing, for example, an inlay substrate. The method for manufacturing the inlay substrate using the heat dissipation material having adhesive is not particularly limited, and the method in which a substrate 11 provided with a hole 10 for inserting a heat dissipation material as illustrated in FIG. 2(a) is previously heated, and a heat dissipation material B having adhesive on which a heat dissipation material 12 is coated with the heat dissipation material adhering composition 13 is inserted into the hole 10 of the substrate 11 as illustrated in FIG. 2(b), and thereafter the heat dissipation material is pressed in a direction indicated by an arrow in the figure with a press machine can be used. As the press machine, it is possible to use a press machine normally used for fixing the heat dissipation material or a vacuum press machine.

The press conditions are not limited, and it is preferable that the heat dissipation material adhering composition is cured by pressing the heat dissipation material at 150° C. to 190° C. and the surface pressure at 5 to 15 kg/cm$^2$ for 30 to 120 minutes.

The temperature at which the substrate is previously heated is not particularly limited, and the temperature is preferably 40° C. to 90° C., and more preferably 50° C. to 80° C. By previously heating the substrate in this manner, when inserting the heat dissipation material having adhesive into the hole of the substrate, the heat dissipation material adhering composition applied to the heat dissipation material is melted by heat, so that it is possible to easily insert the heat dissipation material having adhesive.

Since the heat dissipation material adhering composition has a suitable viscosity, the heat dissipation material having adhesive obtained as above can be pressed without the heat dissipation material adhering composition flowing out from between the substrate and the heat dissipation material at the time of pressing, and can be easily fixed to the substrate.

Accordingly, according to the heat dissipation material adhering composition of the present invention, since it is possible to ensure stable adhesion when fixing the heat dissipation material to the substrate, it is possible to solve the problems in the related art such as the heat dissipation material falling out due to lack of adhesion force. In addition, since the heat dissipation material having adhesive of the present invention can be easily inserted into the substrate, work efficiency improves and cost can be reduced.

The method of using the heat dissipation material adhering composition is not limited to the above description, and it is possible to insert the heat dissipation material into the substrate without drying and removing the solvent after applying the heat dissipation material adhering composition to the heat dissipation material, for example.

In addition, it is possible to apply the heat dissipation material adhering composition to a release film or the like, dry and remove the solvent, and use the material as a film shape.

In addition, when inserting the heat dissipation material having adhesive into the substrate and pressing the heat dissipation material, the heat dissipation material can be temporarily fixed to the substrate by plastically deforming the adhering composition without curing the adhering composition by heating.

EXAMPLES

Examples of the present invention are described below, but the present invention is not limited by the following examples. In the following, the mixing proportion, and the like are based on mass unless otherwise specified.

In accordance with the mixture illustrated in Table 1 below, a resin component (resin or resin solution), a curing agent, and a silver coated copper powder as an inorganic filler were mixed to prepare heat dissipation material adhering composition. The percentage by volume (vol %) of the silver coated copper powder can be calculated with the density of the silver coated copper powder being 9.1 g/cm$^3$ and the density of the other raw materials being 1.1 g/cm$^3$.

Solid epoxy resin 1: trisphenol type epoxy resin "VG3101L" manufactured by Printech Corporation, 50% by mass of methyl ethyl ketone solution Solid epoxy resin 2: bisphenol A type epoxy resin "JER1010" manufactured by Mitsubishi Chemical Corporation, 50% by mass of methyl ethyl ketone solution Liquid epoxy resin: bisphenol F type epoxy resin, "EP-4901E" manufactured by ADEKA Corporation Bismaleimide compound: "BMI-3000CG" manufactured by Designer Molecules Inc., 60% by mass of toluene solution Imidazole-based curing agent: "2E4MZ (2-ethyl-4-methylimidazole)" manufactured by Shikoku Chemicals Corporation Cation-based curing agent: tetra-n-butylphosphonium tetraphenylborate Radical-based curing agent: cumene hydroperoxide Silver coated copper powder 1: 10% by mass of silver coated amount, spherical, 5 μm of average particle diameter Silver coated copper powder 2: 10% by mass of silver coated amount, spherical, 10 μm of average particle diameter The complex viscosity of the obtained heat dissipation material adhering composition was measured by the following method.

Complex viscosity measurement method: A heat dissipation material adhering composition was applied to a release-treated polyethylene terephthalate (PET) resin so as to have a thickness of approximately 100 μm, and a solvent was dried at 50° C. for 30 minutes to prepare a film. Subsequently, the PET resin was peeled off from the film, and six films including the obtained heat dissipation material adhering composition were superimposed to obtain a measurement sample, and the measurement was performed using the following device under the following measurement conditions.

Device name: modular compact rheometer MCR 302 manufactured by Anton Paar Co., Ltd.

Plate: D-PP25/AL/S07, diameter of 25 mm

Swing angle: 0.1%

Frequency: 1 Hz

Measuring range: 25° C. to 200° C.

Heating rate: 5° C./min

A tape was attached to the upper surface and the bottom surface of the heat dissipation material with diameter of +5.88 mm and thickness of 1.5 mm including a hybrid material using copper, porous copper, and carbon fiber. The heat dissipation material adhering composition was applied to it by a dipping method, and after drying at 40° C. for 1 hour, the tape was peeled off to prepare a heat dissipation material having adhesive. Thereafter, the heat dissipation material having adhesive was embedded in a hole with diameter of φ6.0 mm and depth of 1.5 mm provided in a flame retardant type 4 (FR-4) substrate, and was pressed using a press machine at a maximum temperature of 190° C. and a surface pressure of 10 kg/cm² for 1 hour to prepare an inlay substrate.

The obtained inlay substrate was subjected to evaluation of the gap between the heat dissipation material having adhesive and through-hole plating and measurement of adhesion strength were performed by the following method. The results are indicated in Table 1.

Evaluation of gap between heat dissipation material having adhesive and through-hole plating: The cross section of the inlay substrate was observed with an optical microscope (magnification: 80 times) and evaluated as "poor" in a case where there was a gap between the heat dissipation material having adhesive and the through-hole plating, and evaluated as "good" in a case where there was no gap therebetween.

Measurement method of adhesion strength: A metal rod with diameter of φ2.5 mm was pressed against the heat dissipation material portion having adhesive of the inlay substrate and pushed at 20 mm/min, and the strength until the heat dissipation material having adhesive fell off was measured. The measurement was applied to both the initial inlay substrate and the inlay substrate after solder dipping. The strength is desirably 100 N or more.

heat dissipation material having adhesive and the through-hole plating, the adhesion strength of the heat dissipation material having adhesive was less than 100 N, and stable adhesion was not obtained.

REFERENCE SIGNS LIST

A, B . . . Heat dissipation material having adhesive
1 . . . Fluororesin sheet
2, 12 . . . Heat dissipation material
3, 13 . . . Heat dissipation material adhering composition
10 . . . Hole
11 . . . Substrate

The invention claimed is:

1. A heat dissipation material adhering composition comprising:
   a resin component containing an epoxy resin;
   a curing agent; and
   an inorganic filler component that consists of at least one selected from the group consisting of gold powder, silver powder, copper powder, nickel powder, powder of alloy, silver coated copper powder, gold coated copper powder, silver coated nickel powder, gold coated nickel powder, graphene, carbon, and a combination thereof, the powder of alloy comprising two or more metals selected from gold, silver, copper, and nickel,
   wherein the heat dissipation material adhering composition is devoid of other inorganic fillers,
   wherein a content of the inorganic filler component is from 20% to 65% by volume based on a total amount

TABLE 1

|  | Example 1 | Example 2 | Example 3 | Example 4 | Example 5 | Comparative Example 1 | Comparative Example 2 |
|---|---|---|---|---|---|---|---|
| Solid epoxy resin 1 | 70 | 70 | 70 | 65 | 50 | — | 70 |
| Solid epoxy resin 2 |  |  |  |  | 20 |  |  |
| Liquid epoxy resin | 30 | 30 | 30 | 25 | 30 | 100 | 30 |
| Bismaleimide compound | — | — | — | 10 | — | — | — |
| Imidazole-based curing agent | 6 | 6 | — | — | 6 | 6 | 6 |
| Cation-based curing agent | — | — | 5 | — | — | — | — |
| Radical-based curing agent | — | — | — | 6 | — | — | — |
| Silver coated copper powder 1 | 900 | — | 900 | 900 | 900 | 200 | 2000 |
| Silver coated copper powder 2 | — | 1200 | — | — | — | — | — |
| Percent by volume (vol %) of silver coated copper powder | 50.6 | 57.8 | 50.9 | 50.6 | 51 | 18.6 | 69.5 |
| Complex viscosity at 80° C. (Pa · s) | 8.00E+05 | 1.00E+06 | 7.20E+05 | 7.40E+05 | 9.30E+05 | 8.90E+02 | 9.00E+06 |
| Evaluation of gap between heat dissipation material having adhesive and through-hole plating | good | good | good | good | good | poor | poor |
| Adhesion strength (N) Initial | 210 | 172 | 183 | 207 | 206 | 35 | 10 |
| Adhesion strength (N) After solder dipping | 230 | 175 | 191 | 222 | 213 | 20 | 9 |

The results are indicated in Table 1. In Examples 1 to 5 in which the complex viscosity of the heat dissipation material adhering composition was within the range of $1\times10^3$ Pa·s to $5\times10^6$ Pa·s, the heat dissipation material having adhesive and the through-hole plating were in close contact with each other without any gap. In addition, in Examples 1 to 5, the adhesion strength of the heat dissipation material having adhesive was 100 N or more, and stable adhesion was obtained. On the other hand, in Comparative Examples 1 and 2 in which the complex viscosity was out of the range of $1\times10$ Pa·s to $5\times10^6$ Pa·s, a gap was observed between the of the resin component, the curing agent, and the inorganic filler component, and
wherein the heat dissipation material adhering composition has a complex viscosity at 80° C. of from $1\times10^5$ Pa·s to $5\times10^6$ Pa·s.

2. The heat dissipation material adhering composition according to claim 1,
wherein the resin component is one type or two or more types of resins selected from a solid epoxy resin and a liquid epoxy resin.

3. The heat dissipation material adhering composition according to claim 1,
wherein the curing agent is one type or two or more types selected from an imidazole-based curing agent, a cation-based curing agent, and a radical-based curing agent.

4. A heat dissipation material having adhesive, which is obtained by coating a portion or the whole of a surface of a heat dissipation material with the heat dissipation material adhering composition according to claim 1.

5. An inlay substrate comprising the heat dissipation material having adhesive according to claim 4.

6. A method for manufacturing an inlay substrate comprising:
a step of preheating a substrate;
a step of inserting the heat dissipation material having adhesive according to claim 4 into the heated substrate; and
a step of fixing the heat dissipation material having adhesive to the substrate by pressing the heat dissipation material in an inserting direction.

7. The heat dissipation material adhering composition according to claim 1, wherein the resin component consists of the epoxy resin.

8. The heat dissipation material adhering composition according to claim 1,
wherein the curing agent comprises at least one of a cation-based curing agent and a radical-based curing agent,
wherein the cation-based curing agent is at least one selected from the group consisting of an amine salt of boron trifluoride, P-methoxybenzene diazonium hexafluorophosphate, diphenyliodonium, hexafluorophosphate, triphenylsulfonium, tetra-n-butylphosphonium tetraphenylborate, and tetra-n-butylphosphonium-o,o-diethylphosphorothioate, and
wherein the radical-based curing agent is at least one selected from the group consisting of di-cumyl peroxide, t-butyl cumyl peroxide, t-butyl hydroperoxide, cumene hydroperoxide, and an azo-based compound.

9. The heat dissipation material adhering composition according to claim 1, further comprising a bismaleimide compound represented by the following General Formula (I):

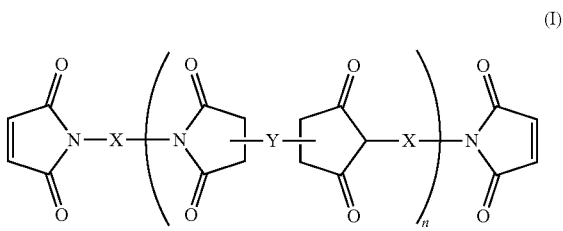

wherein X represents a hydrocarbon group having 10 to 30 carbon atoms in a main chain, which is a first aliphatic group, a first alicyclic group, or a first aromatic hydrocarbon group,
Y represents a second aliphatic group, a second alicyclic group, or a second aromatic hydrocarbon group, and
n is an integer in a range of 1 to 20.

10. The heat dissipation material adhering composition according to claim 9, wherein the bismaleimide compound is represented by the following General Formula (II):

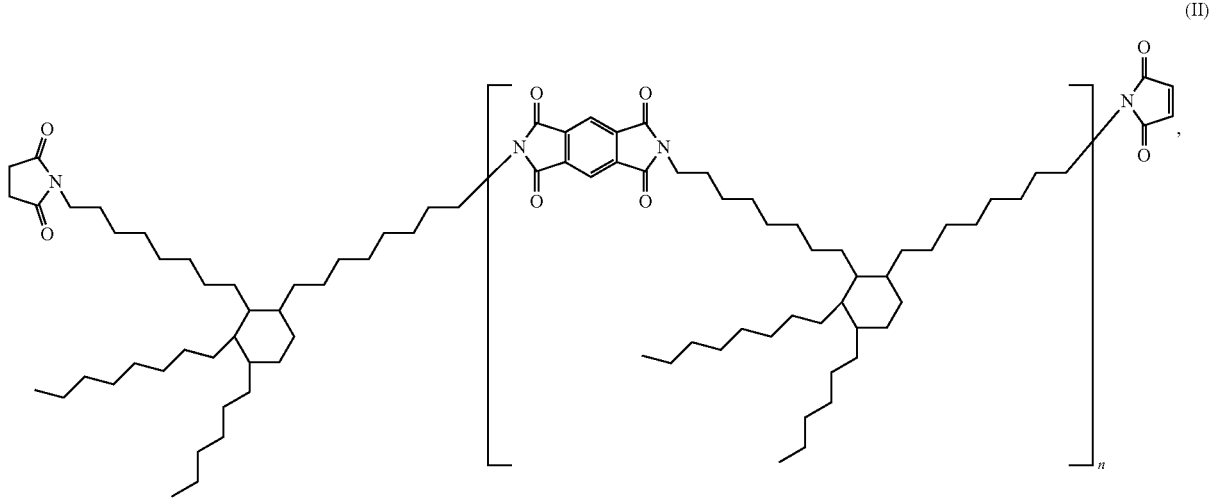

and
wherein n is an integer in a range of 1 to 20.

11. The heat dissipation material adhering composition according to claim 1, wherein the complex viscosity at 80° C. is within the range of from $7.2 \times 10^5$ Pa·s to $5 \times 10^6$ Pa·s.

* * * * *

UNITED STATES PATENT AND TRADEMARK OFFICE
CERTIFICATE OF CORRECTION

PATENT NO. : 11,236,227 B2  
APPLICATION NO. : 15/737912  
DATED : February 1, 2022  
INVENTOR(S) : Hiroaki Umeda et al.

Page 1 of 1

It is certified that error appears in the above-identified patent and that said Letters Patent is hereby corrected as shown below:

In the Claims

<u>At Column 11, Line 33 – Column 12, Line 1 (Claim 8):</u>  
Change "diphenyliodonium, hexafluorophosphate"  
To be -- "diphenyliodonium hexafluorophosphate" --

Signed and Sealed this  
Twelfth Day of April, 2022

Drew Hirshfeld  
*Performing the Functions and Duties of the  
Under Secretary of Commerce for Intellectual Property and  
Director of the United States Patent and Trademark Office*